(12) United States Patent
Gensler et al.

(10) Patent No.: US 9,144,763 B2
(45) Date of Patent: Sep. 29, 2015

(54) FILTER ARRANGMENT, IN PARTICULAR AIR FILTER ARRANGEMENT

(75) Inventors: Harry Gensler, Leonberg (DE); Thilo Rother, Stuttgart (DE); Hannes Sutschitsch, Eberndorf (AT); Matthias Traub, Boeblingen (DE); Hendrik Von Merkatz, Remseck (DE); Hans Waibel, Remseck Aldingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 13/704,626

(22) PCT Filed: Jun. 14, 2011

(86) PCT No.: PCT/EP2011/059780
§ 371 (c)(1),
(2), (4) Date: Mar. 4, 2013

(87) PCT Pub. No.: WO2011/157680
PCT Pub. Date: Dec. 22, 2011

(65) Prior Publication Data
US 2013/0152524 A1    Jun. 20, 2013

(30) Foreign Application Priority Data
Jun. 16, 2010   (DE) .......................... 10 2010 023 974

(51) Int. Cl.
*B01D 46/00*    (2006.01)
*B01D 46/48*    (2006.01)
*B01D 46/24*    (2006.01)
(Continued)

(52) U.S. Cl.
CPC ............ *B01D 46/48* (2013.01); *B01D 46/0089* (2013.01); *B01D 46/2411* (2013.01); *B01D 46/521* (2013.01); *F02M 35/0216* (2013.01); *F02M 35/02416* (2013.01)

(58) Field of Classification Search
CPC .... B01D 46/48; B01D 46/521; F02M 35/216; F02M 35/2416
USPC .................... 55/429, 430, 493, 503
See application file for complete search history.

(56) References Cited

U.S. PATENT DOCUMENTS

| 5,277,157 | A | 1/1994 | Teich |
| 7,018,438 | B2* | 3/2006 | Duggan .......................... 55/418 |
| 8,551,205 | B2 | 10/2013 | Berisha et al. |

FOREIGN PATENT DOCUMENTS

| CN | 2032907 U | 2/1989 |
| CN | 101678264 A | 3/2010 |

(Continued)

OTHER PUBLICATIONS

English abstract for DE-19638791, Mar. 26, 1998.

(Continued)

*Primary Examiner* — Jason M Greene
*Assistant Examiner* — Karla Hawkins
(74) *Attorney, Agent, or Firm* — Fishman Stewart Yamaguchi PLLC

(57) ABSTRACT

A filter arrangement may include a housing having an untreated space inlet and a clean space outlet and a filter insert configured to attached to the clean space outlet in the housing and to separate a clean space in the interior of the filter insert from an untreated space outside the filter insert. A lining part may be arranged on the filter insert at the clean space, wherein the lining part is configured to form a collection space for dirt retained by the filter wall in the vicinity of the clean space outlet.

17 Claims, 2 Drawing Sheets

(51) Int. Cl.
*B01D 46/52* (2006.01)
*F02M 35/02* (2006.01)
*F02M 35/024* (2006.01)

(56) References Cited

FOREIGN PATENT DOCUMENTS

| DE | 3916544 | A1 | | 11/1990 | |
|---|---|---|---|---|---|
| DE | 19638791 | A1 | | 3/1998 | |
| DE | 10328002 | | * | 1/2005 | ............. B01D 46/00 |
| DE | 10328002 | A1 | | 1/2005 | |
| EP | 0872268 | A2 | | 10/1998 | |
| WO | WO-97/00113 | A1 | | 1/1997 | |

OTHER PUBLICATIONS

English abstract for DE-10328002, Jan. 13, 2005.
English abstract for DE-3916544, Nov. 22, 1990.
English abstract for EP-0872268, Oct. 21, 1998.
English abstract for CN-2032907.
Chinese Office Action for CN-201180029314.9, dated Mar. 31, 2014.

* cited by examiner

FILTER ARRANGMENT, IN PARTICULAR AIR FILTER ARRANGEMENT

CROSS-REFERENCE TO RELATED APPLICATIONS

This application claims priority to German Patent Application 10 2010 023 974.7 filed on Jun. 16, 2010 and International Patent Application PCT/EP2011/059780 filed on Jun. 14, 2011, both of which are hereby incorporated by reference in their entirety.

TECHNICAL FIELD

The invention relates to a filter arrangement, in particular an air filter arrangement, with a housing having raw space inlet and a clean space outlet, and to a filter insert which can be attached to the clean space outlet in the housing, and the filter wall of which separates a clean space in the interior of the filter insert from an untreated space in the interior of the housing outside the filter insert.

BACKGROUND

Such air filter arrangements are used as standard for various types of internal combustion engines. As the raw space is accommodated in the housing outside the filter insert, it can easily be seen during an inspection whether the filter insert must be replaced. However, there is the problem that, if the filter insert is changed carelessly, some of the dirt held in the interior of the housing can get into the clean space outlet. Therefore, the object of the invention is to create a filter arrangement with which the filter insert can be changed without dirt particles being carried into the clean space outlet.

This object is achieved according to the invention in that a lining part for a region of the interior of the housing in the vicinity of the clean space outlet is arranged or can be attached to the filter insert.

SUMMARY

The invention is based on the general concept of creating a collection space on the filter insert for the dirt retained by the filter wall near the clean space outlet. When the filter insert is replaced, all the accumulations of dirt in the vicinity of the clean space outlet must be removed too, so dirt is reliably prevented from trickling into the clean space outlet.

According to an embodiment of the invention with a preferred design, at least one of the following features can be provided: The filter insert has two base discs, between the edge zones of which the filter wall is arranged. An opening which penetrates the filter wall can be connected to the clean space outlet or is connected to the clean space outlet when the filter insert is in the use position. The housing has (when the filter insert is inserted) end walls which are directly adjacent to the base discs and project beyond the edges of the base discs. The end walls are connected to each other by means of a circumferential wall which is at a distance from the filter wall. A drawer is arranged or can be attached to the base disc as the lining piece. The drawer has a closed end which is adjacent to the opening in the filter wall and an open end at a distance therefrom, and walls which bear against the inner sides of the end walls and the circumferential wall when the filter insert is in its use position.

Furthermore, it can expediently be provided for push-guides which interact with each other to be provided on the base discs and on the facing inner sides of the end walls, so that the filter insert is moved on exactly predefined and reproducible paths when replaced.

The opening which penetrates the filter wall of the filter insert is preferably arranged on a flange plate which connects the base discs. This makes secure connection of the opening to the clean space outlet easier. Moreover, it can be provided for the drawer to be latched or locked on the above-mentioned flange plate. In this case, the drawer is connected in particular in a pivotable manner to the flange plate. This pivot connection can e.g. be produced by a bearing pin and one or a plurality of bearing cups which can be clipped thereon. The bearing pin can be arranged wither on the flange plate or on the drawer. The bearing cup is then arranged on the corresponding part, that is, the drawer or the flange plate.

Furthermore, the drawer can have a fastening device, which is arranged on a region at a distance from the connection to the flange plate. This fastening device can interact with one or both base discs in such a manner that a detachable or non-detachable connection is formed. A non-detachable connection means a connection which cannot be released without damaging one part of the join. In contrast, a detachable connection is a connection which can be released and re-established without damage to the parts of the join. The connection between the drawer and the base disc is preferably a detachable latch or snap connection. The connection between the drawer and the base disc is produced by a pivot movement after the drawer is fastened on the flange plate. The drawer is thus connected to the filter insert at at least two points.

In an alternative configuration, the drawer is connected to the filter insert in a non-detachable manner e.g. by adhesive bonding or welding. To this end, the drawer can be fastened at least to one part, e.g. one or both base discs and/or the flange plate.

With regard to preferred features of the invention, reference is made to the claims and to the following explanation of the drawing, using which a preferred embodiment of the invention is described in more detail. Protection is claimed not only for specified or described combinations of features but also for in principle any desired combinations of the specified or described individual features. In the drawing,

DETAILED DESCRIPTION

Figure 1:
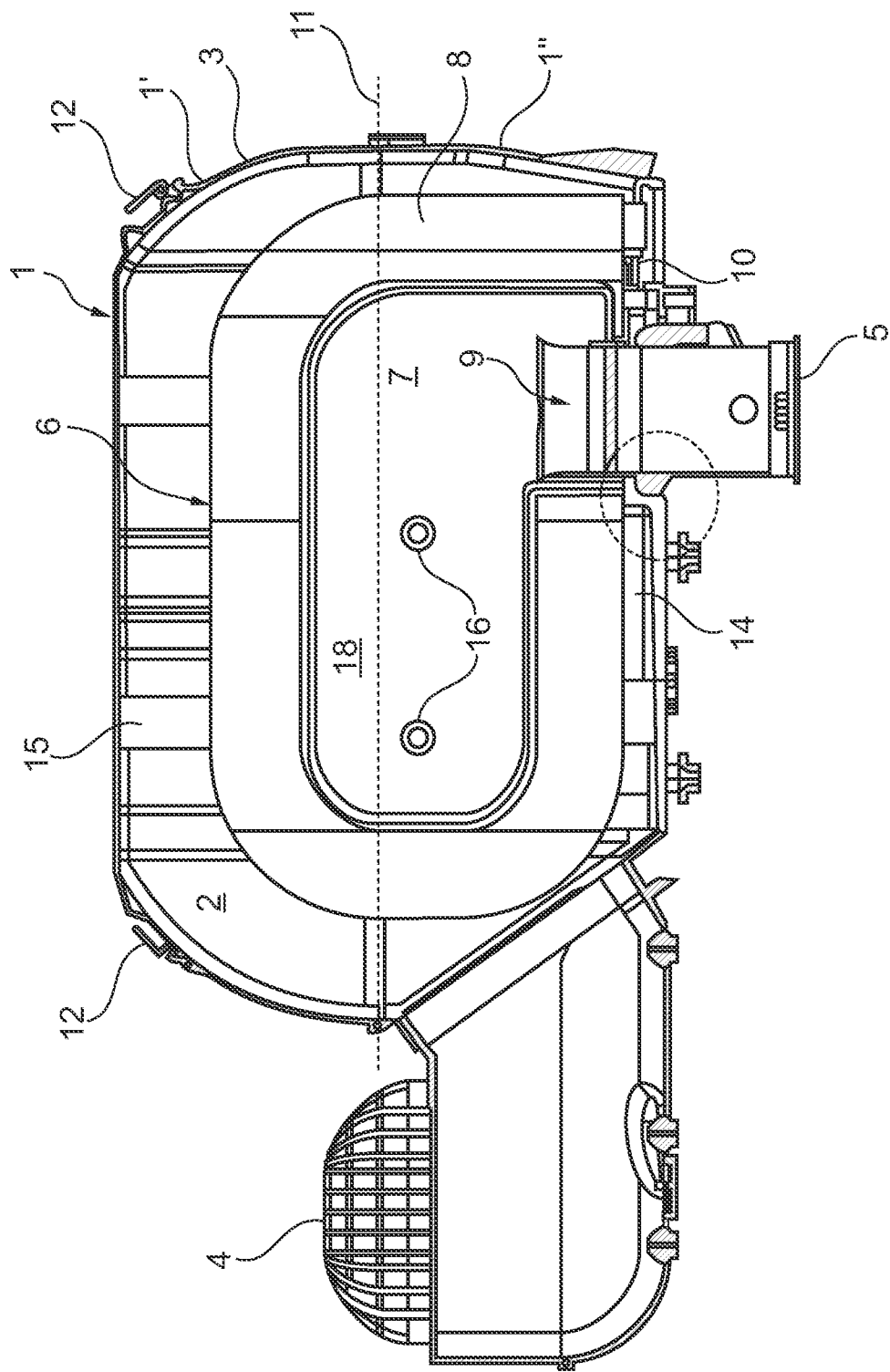
FIG. 1 shows a partially cut away side view of an air filter arrangement according to the invention.
Figure 2:
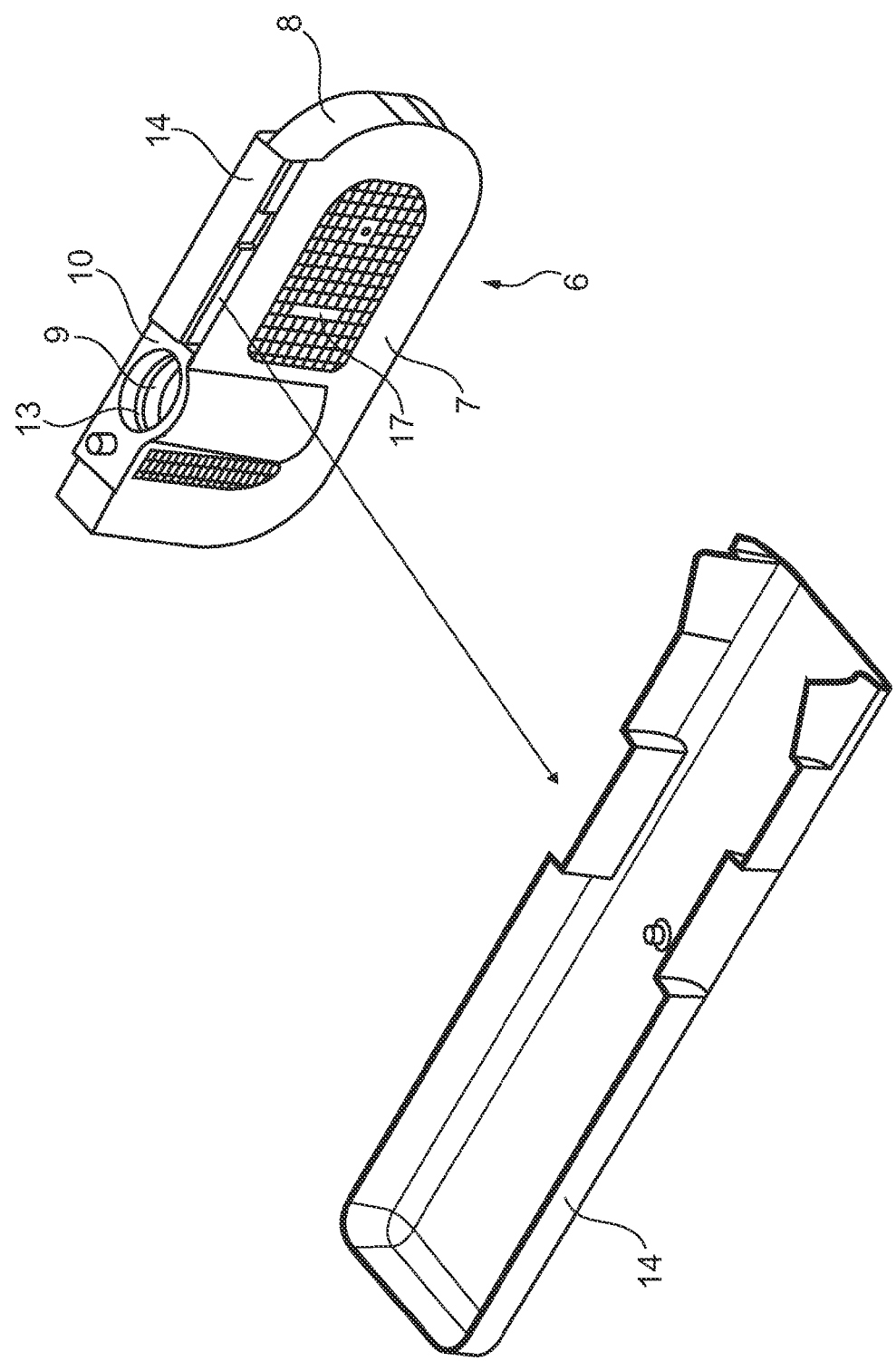
FIG. 2 shows a perspective view of the filter insert.

According to FIG. 1, the air filter arrangement shown there has a housing 1 having end walls 2 which are substantially parallel to the drawing plane and a circumferential wall 3 which connects the end walls 2. An untreated space inlet 4 and a clean space outlet 5 are arranged on the circumferential wall.

Inside the housing 1 there is a filter insert 6 having two base discs 7 which are adjacent to the inner sides of the end walls 2 of the housing 1 and a filter wall 8 which is substantially orthogonal to the base discs 7 and is generally formed by a pleated wall consisting of filter material, the pleats being aligned substantially orthogonally to the base discs 7. The filter wall 8 is connected in a leakproof manner to the base discs 7 at mutually opposite edge zones of the base discs 7. The filter wall 8 is penetrated by an opening 9, which is connected to the clean space outlet 5 when the filter insert 6 is installed, so that the interior of the filter insert 6 forms the clean space 18 and the space remaining outside the filter wall 8 inside the housing 1 forms the raw space 15. The opening 9 is arranged in a flange plate 10, which is connected in a leakproof manner to the base discs 7, it being possible for this connection to be produced by means of form-fitting elements on the flange plate 10 and on the base discs 7 which interact with each other and by means of a seal which is produced by adhesive tracks or the like. Moreover, the flange plate 10 is connected in a leakproof manner to the filter wall 8.

In order to be able to insert the filter insert 6 into the housing 1, the housing 1 can be divided at a dividing plane 11 which is approximately perpendicular to the end walls 2 thereof When the housing 1 is open, that is, when the upper housing part 1' in FIG. 1 has been removed from the other housing part 1" after tensioning levers 12 are opened, the filter inert 6 can be pulled out of the lower housing part 1" or pushed into the lower housing part 1" in the manner of a drawer, a seal 13 on the inner edge of the opening 9 of the filter inert 6 being pushed in a sealing manner onto the outer circumference of a pipe end forming the clean space outlet 5 in the interior of the lower housing part or is detached from this pipe end. To make replacement of the filter insert 6 easier, guide profiles 17 which interact with each other are arranged on the outer sides of the base discs 7 and on the facing inner side of the end walls 2 of the housing. These can be formed in such a manner that the base discs 7 of the filter insert 6 and the ends walls 2 of the housing 1 are also coupled to each other in a form-fitting manner perpendicularly to the wall planes.

The base discs 7 of the filter insert can be connected to each other by column-like supports 16 inside the interior enclosed by the filter wall 8, so that the filter inert 6 forms a stable insertion part.

According to the invention, a drawer 14 is arranged on the filter insert 6, which drawer lines the lower region of the interior of the housing 1, which communicates with the raw space inlet 4 when the filter insert 6 is inserted into the housing 1. The drawer 14 is open at its end facing the raw space inlet 4, but closed at its end which is adjacent to the clean space outlet 5.

During use of the filter, the blind space which is formed in the interior of the drawer 14 and communicates with the raw space inlet 4 forms part of the raw space 15, dirty fluid which enters at the raw space inlet 4 at least partially entering the interior of the drawer 14 and then penetrating the filter wall 8, so that the dirt is retained and cleaned fluid is present in the clean space 18, that is, in the interior of the filter insert 6, which fluid subsequently exits through the clean space outlet 5.

The drawer 14 reliably prevents dirt retained by the filter wall 8 from trickling into the clean space outlet 5 when the filter insert 6 is changed.

To be able to ensure mounting of the drawer 14 on the filter insert 6 as simply as possible, rail-like guide profiles can be arranged on the edges of the sides of the drawer 14 and on the outer sides of the base discs 7, so that the drawer 14 on the filter insert 6 can be pushed into the desired use position. In the target position, latching elements arranged at the end of the drawer adjacent to the clean space outlet 5 can then interact with counter-latching elements on the flange plate 10, so that the drawer 14 is securely held in its target position.

The flange plate 10 thus has a double function, in that it ensures both stable retention of the filter insert 6 on the clean space outlet 5 and secure fixing of the drawer 14.

The invention claimed is:

1. A filter arrangement, comprising: a housing having an untreated space inlet and a clean space outlet and a filter insert configured to be attached to the clean space outlet in the housing, a filter wall of which separates a clean space in the interior of the filter insert from an untreated space outside the filter insert in the interior of the housing, a lining part arranged on the filter insert at the clean space outlet, the lining part having an open end facing the untreated space inlet and a closed end facing the clean space outlet, wherein the lining part is configured to form a collection space for dirt retained by the filter wall in the vicinity of the clean space outlet.

2. The filter arrangement according to claim 1, wherein the lining is formed as a drawer configured to be pushed onto the filter insert.

3. The filter arrangement according to claim 1, wherein the lining part is configured to be clipped to the filter insert.

4. The filter arrangement according to claim 1, wherein the lining part is non-detachably connected to the filter insert.

5. The filter arrangement according to claim 2, wherein the filter insert has two substantially parallel base discs connected at their mutually opposite edge zones by the filter wall, wherein the filter wall is substantially perpendicular to the plane of the base discs and penetrated by an opening connected to the clean space outlet.

6. The filter arrangement according to claim 5, wherein the opening is arranged in a flange plate connected to the base discs.

7. The filter arrangement according to claim 6, wherein the lining is inserted into guides on the base discs and configured to be latched on the flange plate.

8. The filter arrangement according to claim 7, further comprising a transverse wall configured to position the drawer in a target position close to the clean space outlet, the transverse wall having an edge facing the filter insert configured to interact with a counter-latching element on the drawer-side edge of the flange plate in order to fix the drawer.

9. A filter insert for a filter arrangement according to claim 1, wherein the lining part is formed as at least one of an integral and detachable component of the filter insert.

10. The filter arrangement according to claim 1, wherein the filter insert has two substantially parallel base discs connected at their mutually opposite edge zones by the filter wall, wherein the filter wall substantially perpendicular to the plane of the base discs and penetrated by an opening connected to the clean space outlet.

11. The filter arrangement according to claim 10, wherein the opening is arranged in a flange plate connected to the base discs.

12. The filter arrangement according to claim 11, wherein the lining is inserted into guides on the base discs and configured to be latched on the flange plate.

13. The filter arrangement according to claim 12, further comprising a transverse wall configured to position the drawer in a target position close to the clean space outlet, the transverse wall having an edge facing the filter insert configured to interact with a counter-latching element on the drawer-side edge of a flange plate in order to fix the drawer.

14. A filter arrangement, comprising:
a housing having an untreated space inlet and a clean space outlet;
a filter insert configured to be attached to the clean space outlet in the housing, the filter insert having a filter wall separating a clean space in the interior of the filter insert from an untreated space outside the filter insert in the interior of the housing, wherein the filter insert has two substantially parallel base discs connected at their mutually opposite edge zones by the filter wall, wherein the filter wall is substantially perpendicular to the plane of the base discs and penetrated by an opening connected to the clean space outlet, where in the opening is arranged in a flange plate connected to the base discs; and a lining part arranged on the filter insert at the clean space outlet, wherein the lining part forms a collection space for dirt retained by the filter wall in the vicinity of the clean space outlet, wherein the lining is inserted into guides on the base discs and configured to be latched on the flange plate.

15. The filter arrangement according to claim 14, further comprising a transverse wall configured to position the drawer in a target position close to the clean space outlet, the transverse wall having an edge facing the filter insert configured to interact with a counter-latching element on the drawer-side edge of a flange plate in order to fix the drawer.

16. A filter arrangement, comprising:

a housing having an untreated space inlet and a clean space outlet;

a filter insert configured to be attached to the clean space outlet in the housing, the filter insert having a filter wall separating a clean space in the interior of the filter insert from an untreated space outside the filter insert in the interior of the housing, wherein the filter insert has two substantially parallel base discs connected at their mutually opposite edge zones by the filter wall, wherein the filter wall is substantially perpendicular to the plane of the base discs and penetrated by an opening connected to the clean space outlet, where in the opening is arranged in a flange plate connected to the base discs; and a lining part arranged on the filter insert at the clean space outlet, the lining part formed as a drawer configured to be pushed onto the filter insert, wherein the lining part forms a collection space for dirt retained by the filter wall in the vicinity of the clean space outlet, wherein the lining is inserted into guides on the base discs and configured to be latched on the flange plate.

17. The filter arrangement according to claim 16, further comprising a transverse wall configured to position the drawer in a target position close to the clean space outlet, the transverse wall having an edge facing the filter insert configured to interact with a counter-latching element on the drawer-side edge of the flange plate in order to fix the drawer.

* * * * *